(12) United States Patent
Choi

(10) Patent No.: US 7,656,447 B2
(45) Date of Patent: Feb. 2, 2010

(54) CAMERA MODULE FOR COMMUNICATING THROUGH I2C METHOD

(75) Inventor: Woo Young Choi, Kyungki-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 392 days.

(21) Appl. No.: 11/639,320

(22) Filed: Dec. 15, 2006

(65) Prior Publication Data
US 2007/0146492 A1 Jun. 28, 2007

(30) Foreign Application Priority Data
Dec. 28, 2005 (KR) ............... 10-2005-0131542

(51) Int. Cl.
H04N 3/14 (2006.01)
H04N 5/225 (2006.01)
(52) U.S. Cl. ................. 348/294; 348/372
(58) Field of Classification Search ......... 348/207.1, 348/211.99, 308, 294, 372; 713/320; 257/207, 257/691
See application file for complete search history.

(56) References Cited
U.S. PATENT DOCUMENTS
6,115,822 A * 9/2000 Kim et al. ............ 713/310

7,088,395 B2 * 8/2006 Takayama et al. ........ 348/297
2005/0046740 A1 3/2005 Davis

FOREIGN PATENT DOCUMENTS
CN 2730049 9/2005

OTHER PUBLICATIONS
Chinese Patent Office Action, mailed Feb. 1, 2008 and issued in corresponding Chinese Patent Application No. 200610156603.6.
* cited by examiner Primary Examiner—Nhan T Tran
Assistant Examiner—Akshay Trehan
(74) Attorney, Agent, or Firm—Staas & Halsey LLP

(57) ABSTRACT

The camera module according to the present invention includes a first diode for interrupting overcurrent generated by electrostatic discharge and flowing from an image sensor unit to a serial clock line, a second diode for interrupting the overcurrent generated by the electrostatic discharge and flowing from the image sensor unit to a serial data line, a first switch for cutting off the connection between the image sensor unit and the serial clock line when electric power is not supplied through power line, and a second switch for cutting off the connection between the image sensor unit and the serial data line when the electric power is not supplied through the power line.

4 Claims, 4 Drawing Sheets

CAMERA MODULE FOR COMMUNICATING THROUGH I2C METHOD

RELATED APPLICATION

The present application is based on, and claims priority from, Korean Application Number 2005-131542, filed Dec. 28, 2005, the disclosure of which is incorporated by reference herein in its entirety.

BACKGROUND OF THE INVENTION

1. Field of the Invention

The present invention relates to a camera module employed in a mobile communication terminal, and more particularly, to a camera module for communicating through I2C method, in which a leakage current is prevented from being generated due to a diode provided in the camera module for interrupting overcurrent generated by the static electricity so that electric power consumption can be reduced.

2. Description of the Related Art

Generally, I2C is a two-lined bidirectional serial bus for providing communication links between integrated circuits for products manufactured in commercial quantities such as TVs, VCRs, audio equipment, and the like, and was originally proposed by Phillips Electronic Co. at first. Today, the I2C is a standard solution for embedded applications.

The I2C bus includes a serial clock line SCL for transmitting a clock and a serial data line SDA for transmitting data in serial, wherein the data is transmitted and received according to the clock. Devices connected to the I2C bus communicate as a slave with a master. The I2C is a serial bus protocol capable of communicating with a plurality of slave devices and is connected to the plurality of slave devices through a power line and the two lines SCL and SDA to transmit and receive data.

FIG. 1 is a block diagram schematically illustrating a conventional I2C bus.

Referring to FIG. 1, an I2C master device 1 is connected to a plurality of I2C slave devices 2-1 and 2-2 through the two lines of the serial clock line SCL and the serial data line SDA. The I2C master device 1, in order to control the I2C slave devices 2-1 and 2-2 for supporting the I2C, simply writes data or reads data from the I2C slaves 2-1 and 2-2 using an I2C bus controller (not shown). Moreover, the I2C master device 1 serves as a device for starting the transmission of data by generating a clock pulse and finishing the transmission, and the I2C slave devices 2-1 and 2-2 are devices addressed by the I2C master device 1. When I2C master device 1 generates a starting state, the I2C slave devices 2-1 and 2-2 connected to the I2C bus await for next data. When the I2C master device 1 transmits a slave address, the respective I2C slave devices 2-1 and 2-2 compare the transmitted slave address with their own respective addresses and an I2C slave device having its own address corresponding to the transmitted address transmits a response with respect to a continued ACK signal region. Then, the I2C master device 1 receives and transmits data from and to a corresponding I2C slave device. When the receipt and transmission of data is finished, the I2C master device 1 generates a stopping state and releases the bus. For the operation of the I2C bus, pull-up power $V_{dd}$ (here, pull-up voltage) is applied to the two lines of the serial clock line SCL and the serial data line SDA through respective pull-up resistors.

In a mobile communication terminal having a camera module, the communication between a main digital signal processor DSP of the mobile communication terminal and the camera module is carried out through the I2C bus. In this case, the main DSP serves to as a master device of the I2C bus, and an image sensor (or an image signal processor: ISP) of the camera module serves to as a slave device of the I2C bus.

FIG. 2 is a block diagram schematically illustrating a mobile communication terminal having a conventional camera module for performing communication using the I2C communication method.

As shown in FIG. 2, the conventional camera 11 for performing communication using the I2C communication method is mainly employed in a mobile communication terminal having a camera function, and in this case, the conventional camera 11 communicates with the main DSP of the mobile communication terminal through the I2C bus. Generally, a semiconductor device has diodes, provided at input and output terminals of the semiconductor device, for preventing the semiconductor device from being damaged by overcurrent due to electrostatic discharge ESD. In the camera module 11 and the image sensor unit 112 (or ISP, in this patent application, it is assumed that the image sensor unit 112 includes the ISP) in FIG. 1, diodes 113a and 113b for interrupting the overcurrent are connected between the serial clock line SCL and the serial data line SDA and the image sensor unit 112. These diodes 113a and 113b may be included in the image sensor unit 112.

As described above, when the camera function is not used, a source voltage $V_{cm}$ is 0V by a power down signal provided from a main circuit 12 of the mobile communication terminal and the camera module 11 connected to the I2C bus stops the operation of the image sensor unit 112. At that time, due to characteristics of the diodes 113a and 113b that are connected to the serial clock line SCL and the serial data line SDA of the I2C bus for the purpose of preventing the overcurrent from being transmitted to the I2C bus, leakage currents Il1 and Il2 are supplied from an I2C pull-up power source $V_{dd}$ to the image sensor.

Thus, the conventional camera module 11 for performing the communication using the I2C communication method generates the leakage currents through the serial clock line SCL and the serial data line SDA of the I2C bus at the stopped state when the power source is interrupted to stop the operation of the camera module.

Moreover, there is another method of stopping the operation of the camera module using a power down (PWRDN) input signal supported by the image sensor when the electric power is supplied to the camera module. This method may also generate current consumption of several tens to several hundreds of μA and consumes undesired current in comparison with the method of interrupting the power supplied to the camera module.

SUMMARY OF THE INVENTION

Therefore, the present invention has been made in view of the above problems, and it is an object of the present invention to provide a camera module for performing communication using I2C communication method in which a leakage current is prevented from being generated when an electric power provided to a mobile communication terminal is interrupted so that undesired power consumption due to a camera module in standby state is prevented and operation time and lifespan of a battery of the mobile communication terminal are elongated.

It is another object of the present invention to provide a camera module for performing communication using I2C communication method including a lens; an image sensor unit, to which electric power is supplied through a power line, for converting an image transmitted from the lens into an electric signal, the image sensor unit connected to an I2C bus comprising a serial clock line and a serial data line; a first diode for interrupting overcurrent generated by electrostatic discharge and flowing from the image sensor unit to the serial clock line; a second diode for interrupting the overcurrent generated by the electrostatic discharge and flowing from the image sensor unit to the serial data line; a first switch for cutting off the connection between the image sensor unit and the serial clock line when the electric power is not supplied through the power line; and a second switch for cutting off the connection between the image sensor unit and the serial data line when the electric power is not supplied through the power line.

The image sensor unit may include a first diode and a second diode. The first switch and the second switch may be bus switches, and the first switch and the second switch may be integrally formed into one body.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Figure 1:
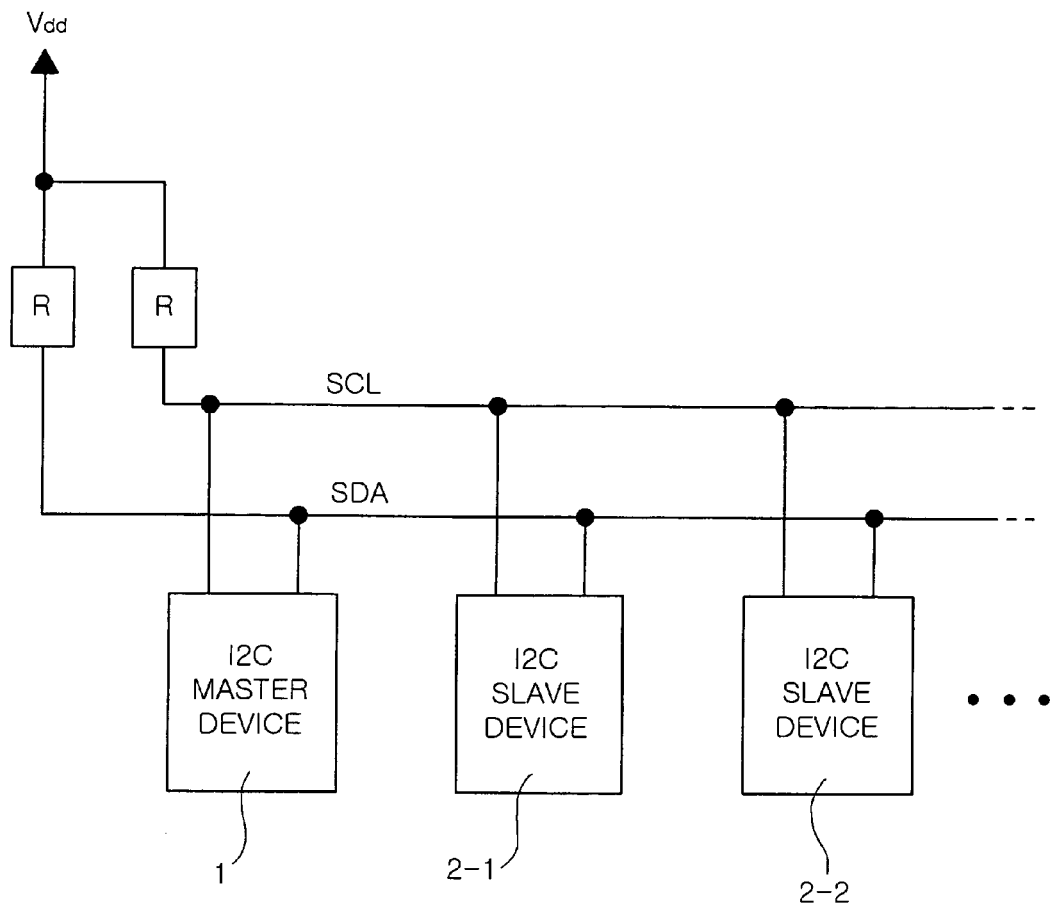
FIG. 1 is a block diagram schematically illustrating a conventional I2C bus.
Figure 2:
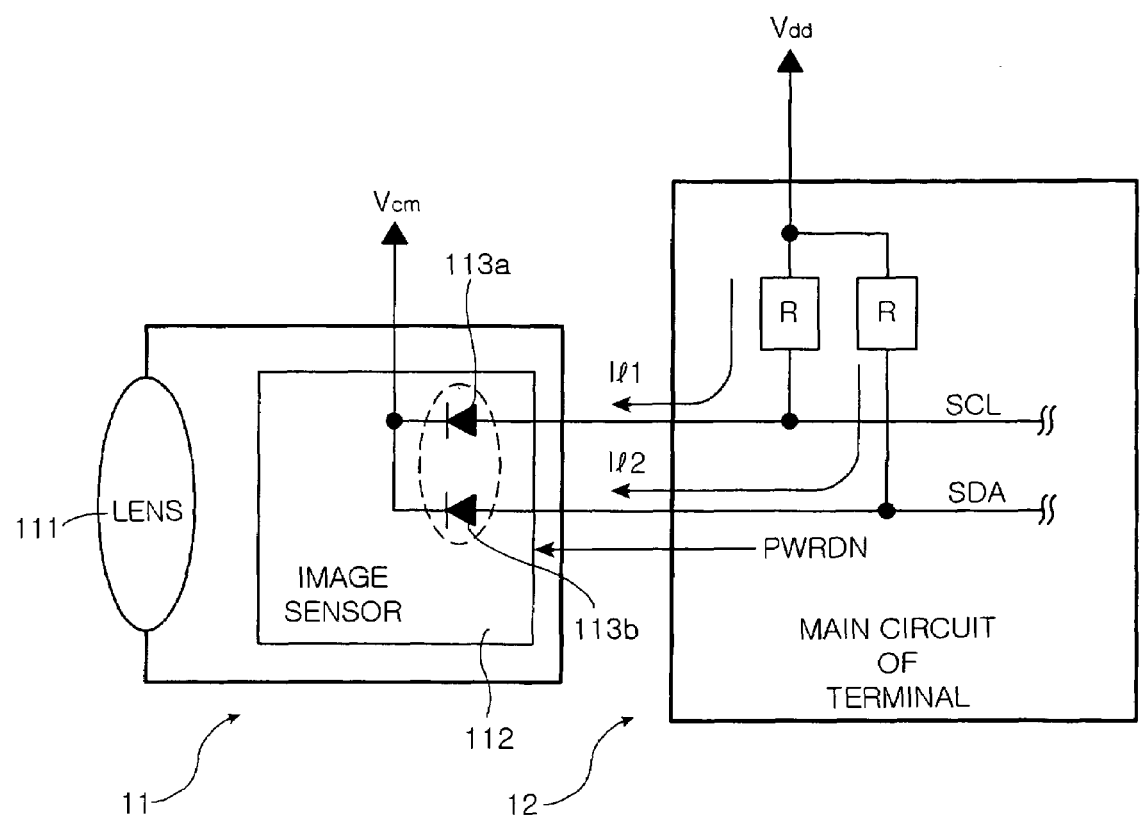
FIG. 2 is a block diagram schematically illustrating a mobile communication terminal having a conventional camera module for performing communication using the I2C communication method.

Hereinafter, the present invention will be described in detail with reference to the accompanying drawings as follows. The present invention may be implemented by various modifications and the scope of the present invention is not limited by the embodiments described later. The embodiments of the present invention are described for the purpose of completely illustrating the present invention to those skilled in the art. Thus, shapes and sizes of components illustrated in the drawings may be exaggerated for the clear description and same reference numeral will be assigned to components having substantially similar function and structure in the drawings.

Figure 3:
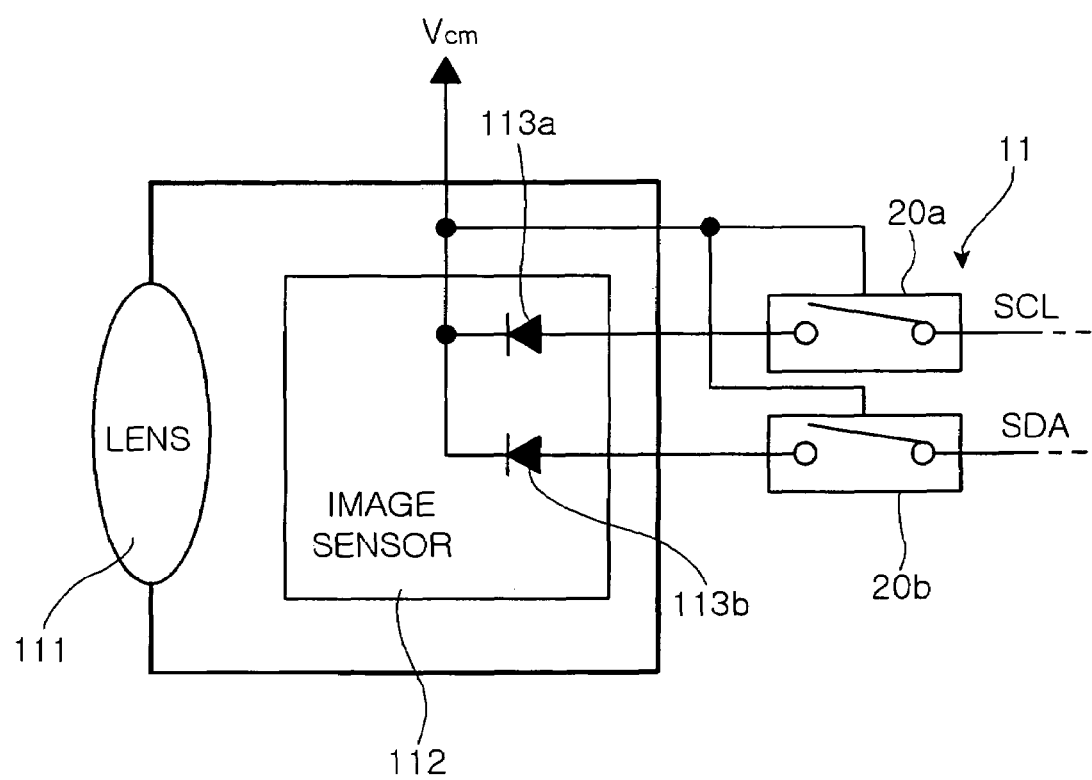
FIG. 3 is a block diagram illustrating a camera module for performing communication using I2C communication method according to an embodiment of the present invention.

FIG. 3 is a block diagram illustrating a camera module for performing communication using I2C communication method according to an embodiment of the present invention.

As shown in FIG. 3, the camera module 11 according to the embodiment of the present invention includes a lens unit 111, an image sensor unit 112 for receiving a predetermined electric power and for converting an image transmitted from the lens unit 111 into an electric signal, a first diode 113a connected to a serial clock line SCL of I2C bus that is connected to the image sensor unit 112, a second diode 113b connected to a serial data line SDA of the I2C bus that is connected to the image sensor unit 112, a first switch 20a for cutting off the electrical connection between the image sensor unit 112 and the serial clock line SCL when the electric power is not supplied to the image sensor unit 112, and a second switch 20b for cutting off the electric connection between the image sensor unit 112 and the serial data line SDA when the electric power is not supplied to the image sensor unit 112.

The camera module 11 according to the embodiment of the present invention may be mainly employed in a mobile communication terminal having a camera function, and in this case, communicates with a main digital signal processor DSP of the mobile communication terminal. In the communication using the I2C bus, in order to remove the leakage current generated when the electric power is not supplied by the diodes 113a and 113b for interrupting the overcurrent transmitted to the I2C bus from the camera module 11, switches 20a and 20b are provided between the serial clock line SCL and the serial data line SDA of the I2C bus and the image sensor unit 112 to be switched on/off according to whether the electric power is supplied or not.

The lens unit 111 transmits an image to be taken to the image sensor unit 112. The lens unit 111 may be manufactured in the form of a module including a plurality of lens for the purpose of functions such as a zooming function, an automatic exposure, and an automatic focusing function manipulated by a user.

The image sensor unit 112 includes an image detecting device for outputting lightness and wavelengths, which are different from each other, of objects as electric values at a level to be processed by the signal processing using a photosensitive semiconductor. In other words, the image sensor unit 112 converts the image inputted from the lens unit 111 into an electric signal and outputs the converted electric signal. The converted electric signal is transmitted to the main DSP of the mobile communication terminal through the I2C bus and is processed in digital, or is processed into predetermined digital data by the image signal processor ISP that may be provided in the camera module 11 and is transmitted to the main DSP of the mobile communication terminal through the I2C bus. Since the image detecting device included in the image sensor unit 112 includes a photosensitive semiconductor device and a plurality of transistors for converting electric variation of the semiconductor device into an electric signal at a predetermined level, a power source is required to provide power thereto. Thus, the image sensor unit 112 receives the electric power through a power line connected the power source.

The diodes 113a and 113b include a first diode 113a and a second diode 113b for respectively interrupting the overcurrent due to the electrostatic discharge from being transmitted to the serial clock line SCL and the serial data line SDA. The diodes 113a and 113b, in order to interrupt the overcurrent transmitted to the I2C bus, respectively have an arrangement in which an electrode connected to the I2C bus becomes an anode and an electrode connected to the power line becomes a cathode.

On the other hand, the diodes 113a and 113b may be disposed on the serial clock line SCL and the serial data line SDA which are connected to the image sensor unit 112 of the camera module 11, and as shown in FIG. 3, may be connected to terminals of the serial clock line SCL and the serial data line SDA of the image sensor unit 112 such that the diodes 113a and 113b are included in the image sensor unit 112. Although not depicted in the drawings, when an image signal processor ISP is provided in the camera module 11, the diodes 113a and 113b may be connected to the terminals of the serial clock line SCL and the serial data line SDA of the image signal processor ISP such that the diodes 113a and 113b are provided in the image signal processor ISP.

The switches 20a and 20b include a first switch 20a and a second switch 20b for interrupting the connection between the image sensor unit 112 and the serial clock line SCL and the connection between the image sensor unit 112 and the serial data line SDA when the electric power is not supplied to the image sensor unit 112.

When there is no need to operate the image sensor unit 112, for example when the user does not use the camera of the mobile communication terminal, there is no need to supply the electric power to the image sensor unit 112. Thus, the source voltage $V_{cm}$ may have a value of 0V. However, although the source voltage $V_{cm}$ is 0V, the leakage current is generated toward the image sensor unit through the serial clock line SCL and the serial data line SDA of the I2C bus due to the characteristics of the first and second diodes 113a and 113b. The leakage current increases the power consumption of the mobile communication terminal in which the camera module is operated so that the operation time of the battery is shortened.

Thus, in the present invention, the electric power supplied to the image sensor unit 112 is used as a control signal and the switches 20a and 20b are provided. The switches 20a and 20b are closed, that is, switched on when the electric power is supplied, and opened, that is, switched off when the electric power is not supplied. In other words, when the image sensor unit 112 is not used, the switches 20a and 20b are opened by which the source voltage $V_{cm}$ supplied to the image sensor unit 112 is 0V so that the switches 20a and 20b interrupt the leakage current flowing to the image sensor unit 112 through the serial clock line SCL and the serial data line SDA of the I2C bus.

Preferably, the first and second switches 20a and 20b are bus switches. Since the two switches perform same operations using a single control signal (here, the source voltage $V_{cm}$), the first switches 20a and 20b are preferably integrally formed into one body.

Figure 4:
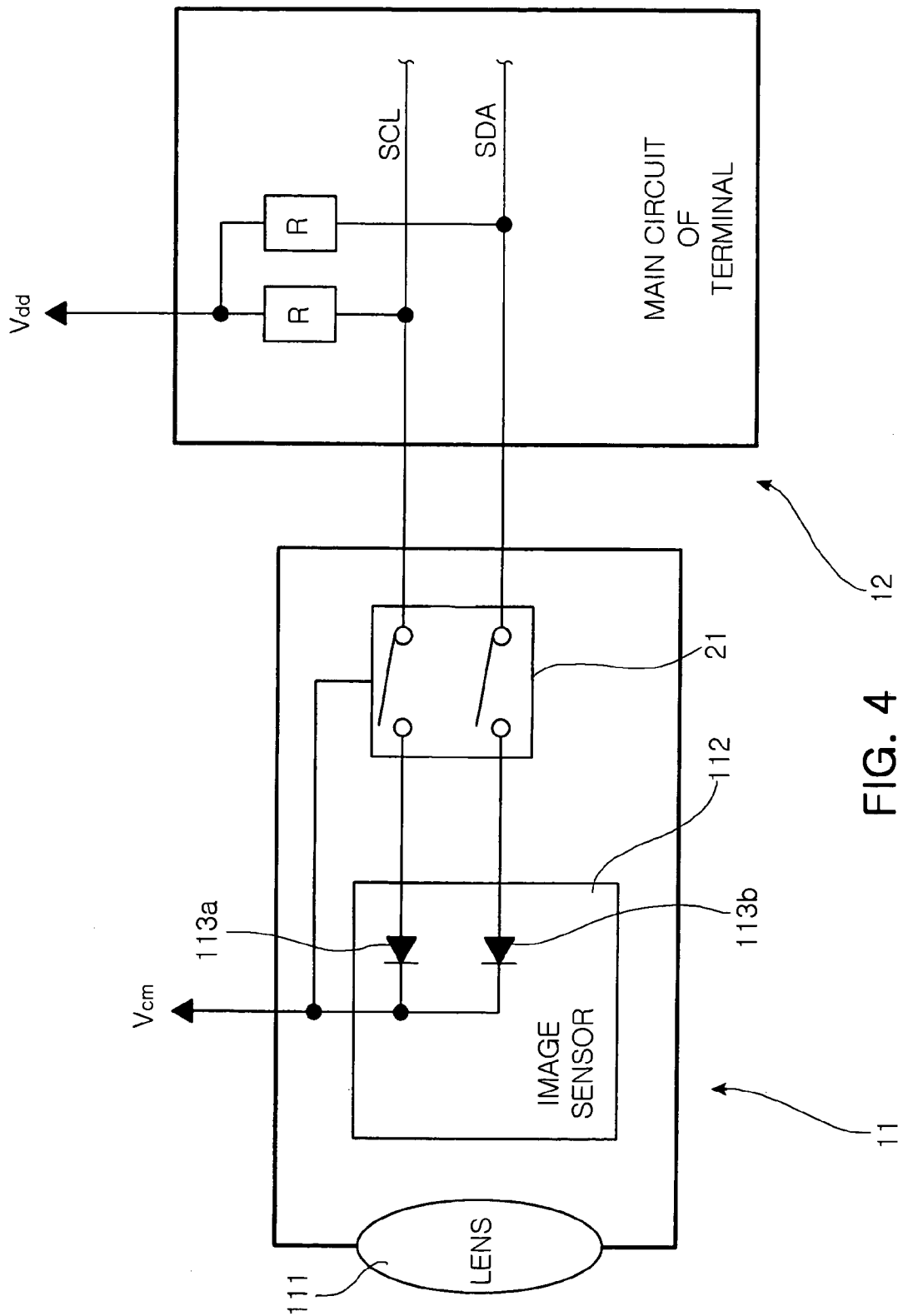
FIG. 4 is a block diagram illustrating a mobile communication terminal employing the camera module for performing communication using I2C communication method according to the embodiment of the present invention.

FIG. 4 is a block diagram illustrating a mobile communication terminal employing the camera module for performing communication using I2C communication method according to the embodiment of the present invention. Referring to FIG. 4, the operation of the camera module according to the embodiment of the present invention will be described in detail.

As shown in FIG. 4, the camera module 11 according to the embodiment of the present invention is connected to the serial clock line SCL and the serial data line SDA of the I2C bus provided in the main circuit 12 of the mobile communication terminal. Each of the serial clock line SCL and the serial data line SDA is connected to the pull-up power $V_{dd}$ through the pull-up resistors. Although not depicted in the drawings, a main DSP of the main circuit 12 of the mobile communication terminal as a master is connected to the serial clock line SCL and the serial data line SDA, and the image sensor unit (or the ISP) of the camera module according to the embodiment of the present invention as a slave is connected to the serial clock line SCL and the serial data line SDA.

When the camera module 11 is operated, for example, when the user takes a picture using the camera function of the mobile communication terminal, the power source $V_{cm}$ of the image sensor unit 112 supplies a voltage required to operate the image sensor unit 112. Due to the source voltage $V_{cm}$, the image sensor unit 112 is driven, the source voltage $V_{cm}$ is supplied to a switch 21 as a control signal such that the switch 21 is switched on to connect the image sensor unit 112 to the serial clock line SCL and the serial data line SDA so that data generated by the image sensor unit 112 can be transmitted to the main circuit of the mobile communication terminal.

On the other hand, when the user does not use the camera function, a power down signal is transmitted to the camera module 11 in order to reduce the power consumption, the source voltage is not supplied to the camera module 11, and the image sensor unit 112 is stopped. In other words, the source voltage $V_{cm}$ becomes 0V. At the same time, the source voltage Vcm is supplied to the switch 21 as the control signal so that the switch 21 cuts off the connection between the image sensor unit 112 and the serial clock line SCL and the connection between the image sensor unit 112 and the serial data line SDA. Thus, due to the diodes 113a and 113b for interrupting the overcurrent, the leakage current generated through the serial clock line SCL and the serial data line SDA of the main circuit 12 of the mobile communication terminal can be interrupted.

As described above, according to the present invention, since the leakage current, existing even when the electric power is not supplied, is interrupted by the overcurrent preventing diodes provided in the camera module, undesired power consumption of the mobile communication terminal having the camera module can be reduced and the operating time and lifespan of the battery can be elongated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A camera module for performing communication using I2C. communication method, comprising:
   a lens;
   an image sensor unit, to which an electric power source voltage is applied through a power line, to convert an image transmitted from the lens into an electric signal, the image sensor unit connected to an I2C bus comprising a serial clock line and a serial data line;
   a first diode to interrupt overcurrent generated by electrostatic discharge and flowing from the image sensor unit to the serial clock line;
   a second diode to interrupt the overcurrent generated by the electrostatic discharge and flowing from the image sensor unit to the serial data line;
   a first switch to cut off the connection between the image sensor unit and the serial clock line when the electric power source voltage is not applied through the power line; and
   a second switch to cut off the connection between the image sensor unit and the serial data line when the electric power source voltage is not applied through the power line,
   wherein the power source voltage is supplied to the first and second switches as a control voltage which controls the on/off state of the first and second switches.

2. The camera module for performing communication using I2C communication method according to claim 1, wherein the image sensor unit comprises a first diode and a second diode.

3. The camera module for performing communication using I2C communication method according to claim 1, wherein the first switch and the second switch are bus switches.

4. The camera module for performing communication using I2C communication method according to claim 1 or claim 3, wherein the first switch and the second switch are integrally formed into one body.

* * * * *

UNITED STATES PATENT AND TRADEMARK OFFICE
CERTIFICATE OF CORRECTION

PATENT NO. : 7,656,447 B2  Page 1 of 1
APPLICATION NO. : 11/639320
DATED : February 2, 2010
INVENTOR(S) : Woo Young Choi It is certified that error appears in the above-identified patent and that said Letters Patent is hereby corrected as shown below:

Column 6, Line 29, change "I2C." to --I2C--.

Signed and Sealed this

First Day of June, 2010

David J. Kappos
*Director of the United States Patent and Trademark Office*